United States Patent [19]

Mims

[11] Patent Number: 4,846,620
[45] Date of Patent: * Jul. 11, 1989

[54] COMPONENT ASSEMBLY SYSTEM

[75] Inventor: Bruce L. Mims, Greens Farms, Conn.

[73] Assignee: Contact Systems, Inc., Danbury, Conn.

[*] Notice: The portion of the term of this patent subsequent to Apr. 25, 2006 has been disclaimed.

[21] Appl. No.: 106,874

[22] Filed: Oct. 13, 1987

Related U.S. Application Data

[63] Continuation-in-part of Ser. No. 947,174, Dec. 29, 1986, Pat. No. 4,824,311.

[51] Int. Cl.⁴ .............................................. B65G 1/06
[52] U.S. Cl. .................................... 414/273; 414/281
[58] Field of Search ............... 414/226, 277, 280–282, 414/222, 273, 331, 416, 659–663; 198/346.1, 346.2, 465.1, 465.2, 468.2, 803.01, 950

[56] References Cited

U.S. PATENT DOCUMENTS

| | | | |
|---|---|---|---|
| 3,674,159 | 7/1972 | Lemelson | 414/276 |
| 3,782,565 | 1/1974 | Doran et al. | 414/281 X |
| 3,920,195 | 11/1975 | Sills et al. | 414/273 X |
| 3,964,577 | 6/1976 | Bengtsson | 414/280 X |
| 4,312,110 | 1/1982 | Averyanov et al. | 198/346.1 X |
| 4,520,919 | 6/1985 | Keitaro et al. | 198/803.01 |
| 4,566,837 | 1/1986 | Shiomi et al. | 198/465.1 X |
| 4,651,863 | 3/1987 | Reuter et al. | 414/280 X |
| 4,668,150 | 5/1987 | Blumberg | 414/273 |

Primary Examiner—David A. Bucci

[57] ABSTRACT

A system to assemble a large number of component parts that are located in various positions and brought together to an assembly position. The system contemplates a pair of intermediate stations located adjacent to the assembly position to which a supply of components are brought prior to being moved to the assembly position.

9 Claims, 5 Drawing Sheets

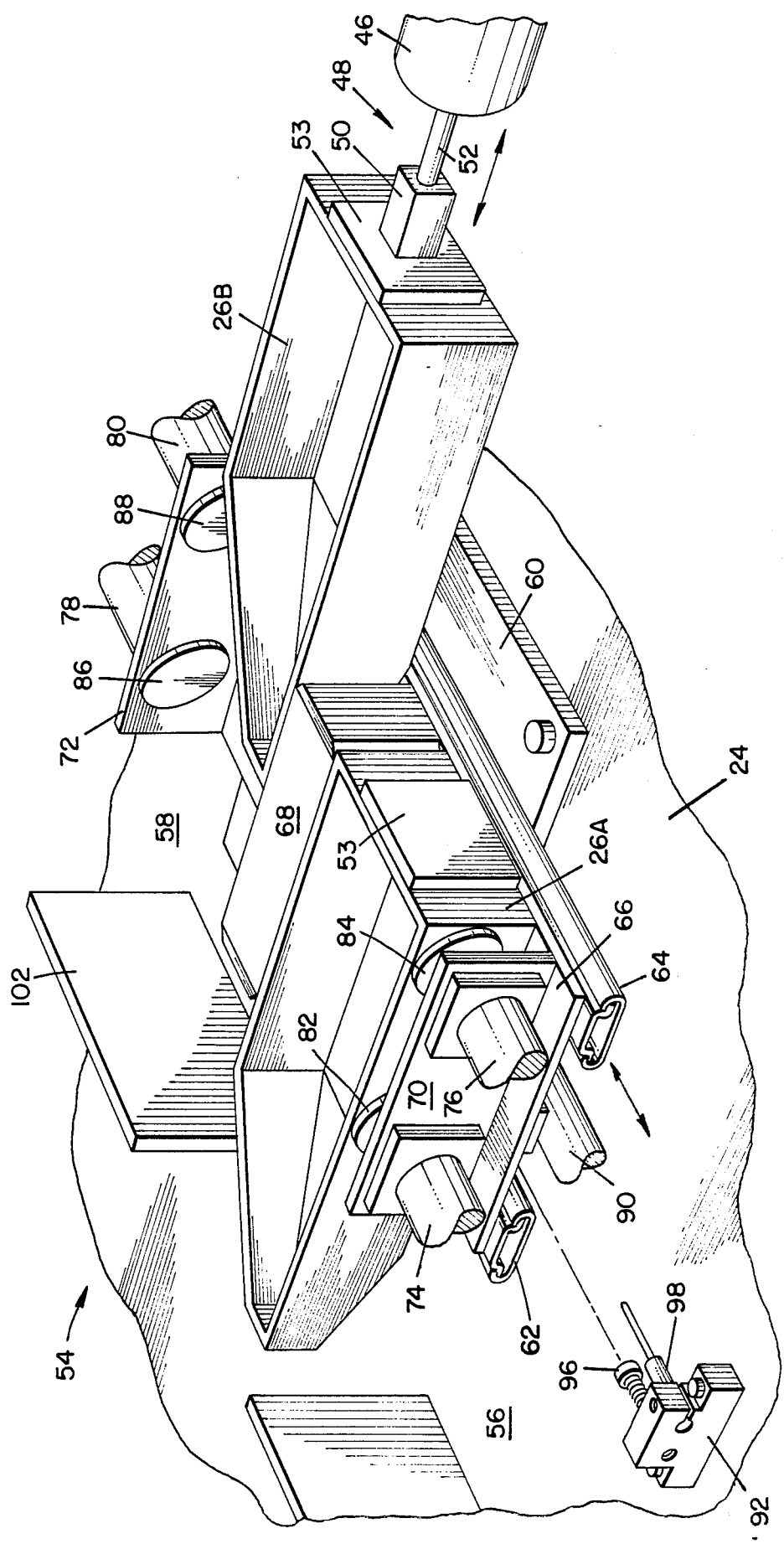

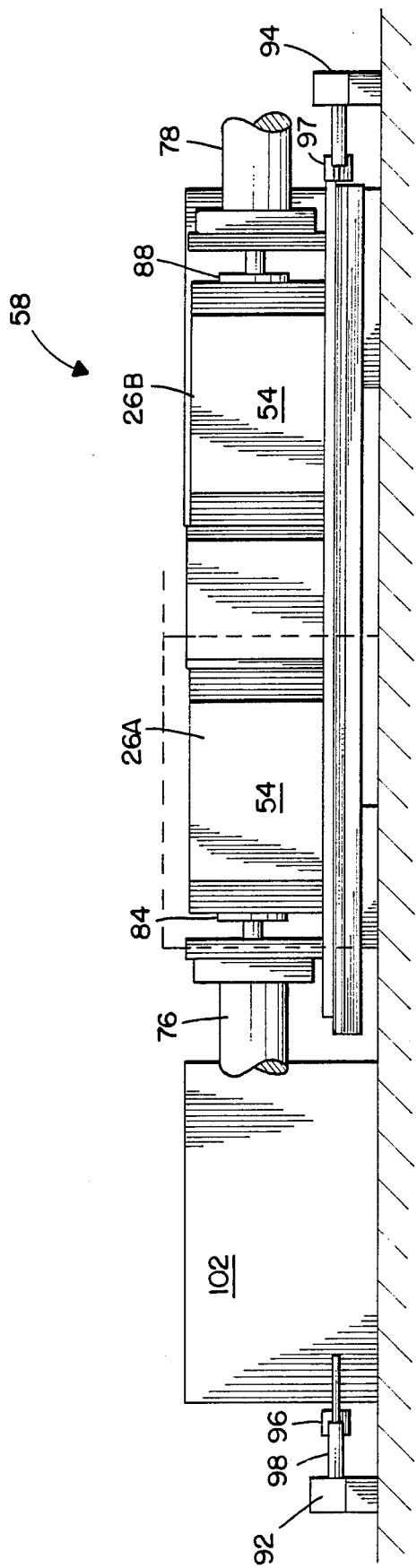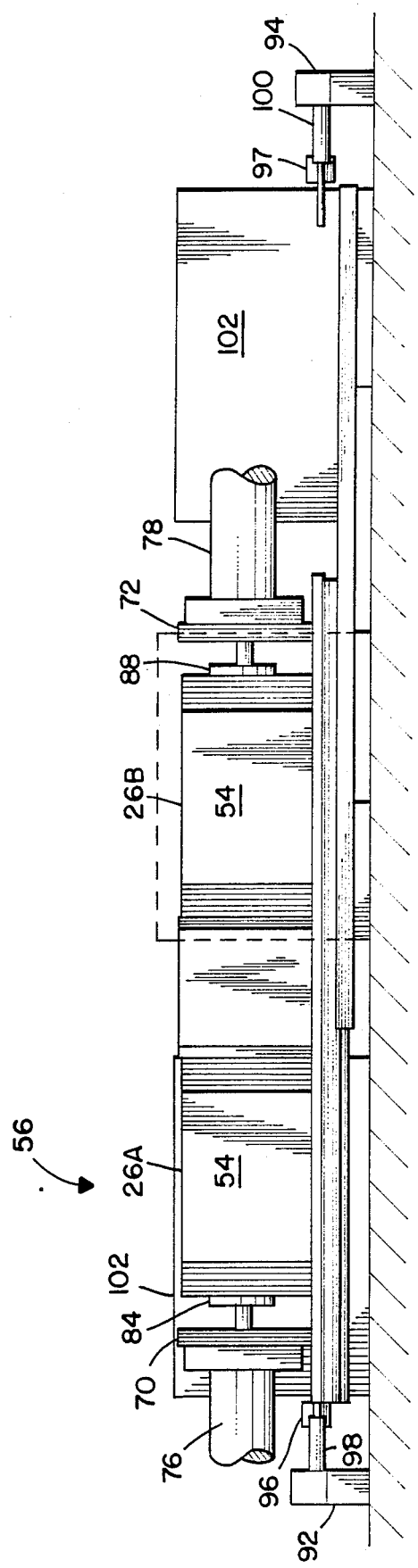

COMPONENT ASSEMBLY SYSTEM

This application is a continuation-in-part of pending U.S. patent application Ser. No. 947174 filed Dec. 29, 1986, now U.S. Pat. No. 4,824,311, herein referred to as the present application.

BACKGROUND OF THE INVENTION

The present invention relates to an assembly system in which a large number of component parts are located in separate containers or bins which are individually and selectively brought to a central location where the parts are extracted from the bins and assembled. Although the invention has utility in the manufacture of various products it will be described with reference to the manufacture of printed circuit boards.

In the fabrication of printed circuit boards, an operator may sit at a console that mounts one or more circuit boards, and circuit elements located in a containers or bins that are conveniently located near the operator. The bins of components may be arranged on a rack of shelves in columns and rows and individual bins brought to a fixed position in a programmed manner where the parts are individually taken from their bins and placed in the appropriate location on the P.C. board by the operator.

A mechanism will bring a bin of components to the assembly location where one or more parts are taken from the bin by the operator and mounted on the P.C. board. Then the operator may activate a switch and the mechanism will remove the component bin and bring another bin into the assembly location. During the time that the prior bin is removed and returned to its home position and the subsequent bin taken from its normal position to the assembly position a considerable amount of time may elapse which constitutes wasted assembly time.

The invention disclosed in the parent application is directed to reducing this wasted assembly time. Accordingly, it discloses a system in which there is a ready position located adjacent to the assembly position and after a component is taken from the bin assembly position a switch is actuated that causes the bin to be removed from the assembly position and an adjacent bin that had been brought to a ready position is then brought into the assembly location. This mechanism of the parent application serves to considerably reduce wasted assembly time. However, it still requires that the bin in the assembly position be withdrawn before the one in the ready position can be brought into the assembly position. The present invention is an improvement on the system disclosed in the parent application in that it eliminates the interval of time during which the bin in the assembly position is withdrawn.

Thus the present invention is designed to minimize the time delay between successive bins of parts being brought to the assembly position where the operator withdraws components from successive bins.

Accordingly, it is the object of the present invention to provide a system for more efficiently and quickly moving bins of components to be assembled to and from a fixed assembly location.

Another object of the present invention is to provide a printed circuit board assembly system in which the circuit elements are located in individual bins which are efficiently and quickly brought to an assembly position for mounting on a circuit board.

A still further object of the invention is to provide a system for fabricating printed circuit boards in which circuit elements are located in containers or bins arranged in rows and columns and in which the individually selected parts bins are brought to an assembly location with minimum delay.

A more specific object of the present invention is to provide a printed circuit board assembly system in which a rack of circuit board parts bins are brought to an assembly location with minimum delay and in which there are two ready positions for the parts bins located in close proximity to the assembly position.

These and other objects of the invention will become apparent from the following description considered with the drawings.

DESCRIPTION OF THE DRAWINGS

FIG. 3 is a perspective view showing component bins at an assembly location;

FIG. 5 is a rear view of an assembly location showing the component bin slide in the right hand position;

FIG. 6 is a rear similar to FIG. 5 with the component slide in the left hand position.

DESCRIPTION OF A SPECIFIC EMBODIMENT

Figure 1:
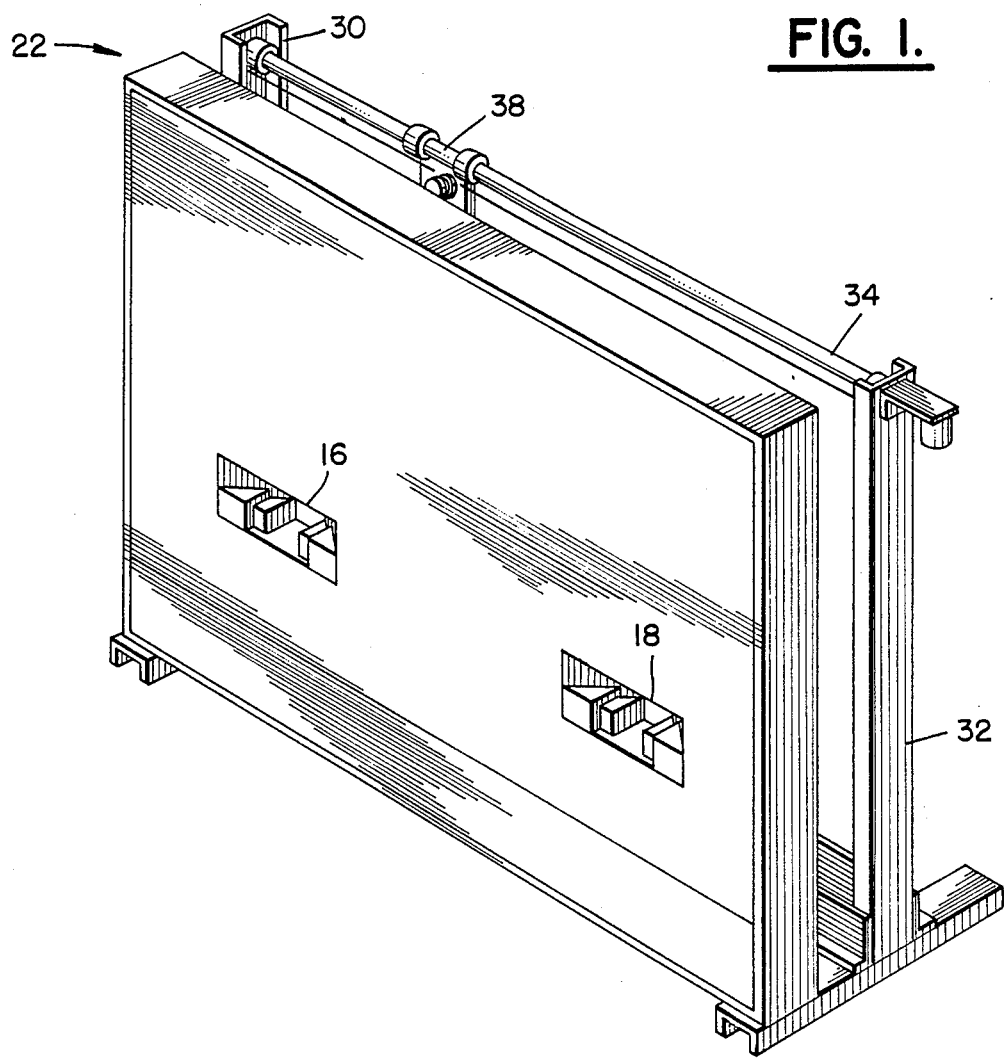
FIG. 1 is a perspective view of the front of a printed circuit board assembly system.

Referring now to FIG. 1 there is shown the front of a bin rack 22 having openings 16 and 18 that constitute assembly locations. A console may be located adjacent to each of the assembly locations at which an operator performs the assembly operation of placing circuit elements onto a printed circuit board as shown and described in the parent application and reference is made thereto for a specific illustration of the type of console that may be used. In general, the console will mount a printed circuit board on an X-Y table which is movable in two directions. The table movement is programmed so that a position on the circuit board which is to receive a circuit element is brought into a mounting location. The operator sitting at the console will activate a switch such as a foot pedal to bring a parts bin to an assembly position. At this time the operator's X-Y table will have moved the circuit board to the appropriate location for mounting the part on the board. The operator will then remove the circuit component from the bin, mount it on the circuit board and press a foot pedal or other switch, the actuation of which, will cause the parts bin to be moved away from the assembly position and the next appropriate parts bin will be brought into position.

Figure 2:
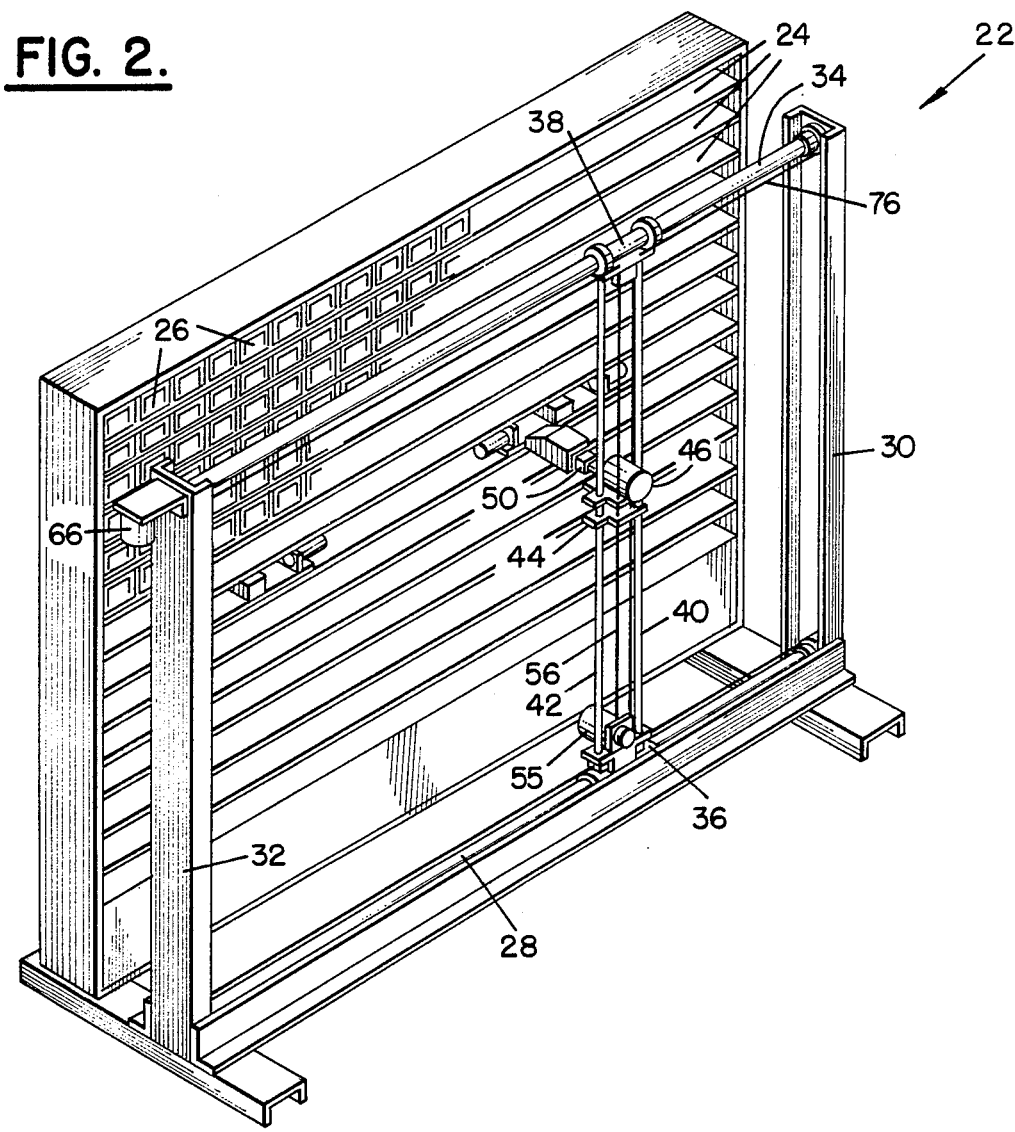
FIG. 2 is a perspective view of the rear of the system of FIG. 1 showing the transport mechanism for moving individual parts bins from their home location to the assembly locations.

FIG. 2 illustrates the back of the rack 22 and the bin transport mechanism which is similar to that shown in the parent application. The numerical designations in FIG. 2 correspond to those in the parent application. The rack has a plurality of shelves 24 which support rows of parts bins 26 each of which may contain a supply of identical circuit elements.

The individual bins are brought to the assembly location by means of an X-Y picker mechanism. The latter comprises a framework consisting of a lower horizontal bar 28, two upstanding support members 30, 32 and an upper horizontal bar 34.

A lower slide assembly 36 rides horizontally or in an X direction on lower bar 28 and upper slide assembly 38 rides along upper bar 34. Slide assemblies 36,38 are joined by carriage support rods 40, 42 which serve to support picker carriage 44. A solenoid actuated air cylinder 46 is mounted on carriage 44 to control a parts bin picker mechanism 48 more clearly seen in FIG. 3. The picker includes an electromagnetic head 50 secured to a ball slide 52 that reciprocates under control of pneumatic cylinder 46, and insures against rotation of the picker 48. The parts bins 26 have secured thereto a magnetically attracted material plate 53 by which the bin may be moved under the control of the picker magnet 50. To transport a parts bin from its home position on the rack of FIG. 2 to an assembly location the picker 48 under the control of the pneumatic cylinder 46 reciprocates forward so the electromagnet 50 engages the parts bin at which time the magnet is energized. The picker is then reciprocated rearwardly to move the bin from its home position on the shelf.

Slide assembly 36 includes an electric motor 55 that may be called the Y motor and which drives a belt 56 which passes over a sprocket on slide 38 and is secured to picker carriage 44. Thus the selective rotation of motor 55 will cause the picker carriage to rise or lower to a desired vertical location to engage or disengage a particular parts bin.

A stepping motor 66 is secured to the upper end of support 32 and drives a belt 76 which in turn drives the carriage 44 to a selected horizontal location to engage a parts bin as more particularly described in the parent application. It is seen then that when it is desired to move a parts bin the motors 55 and 66 are energized to move the picker carriage to a position in which the picker mechanism is aligned with the desired bin. The pneumatic cylinder 46 will then reciprocate the picker arm 52 to bring the electromagnet in contact with the parts bin at which time the magnet is energized. The picker arm is then reciprocated rearwardly to withdraw the bin from its location and the motors are again energized to move the picker carriage to another location to deposit the bin. The transport mechanism is controlled by a suitable programmed processor so that the individual parts bins are sequentially brought from their home positions on the rack 22, to the assembly location in a predetermined sequence.

The principal features of the present invention over that disclosed in the parent application is in the bin movement mechanism located at each of the assembly locations 16 and 18. This bin movement structure is more clearly shown in FIGS. 3 and 4 wherein two bins 26A and 26B are shown positioned on a carriage structure that operates to bring them into the assembly position as hereinafter described.

The bin 26A is located in the assembly position designated 54. In this position of the bin, the operator can conveniently reach through the front opening of the rack 22 and extract a circuit component. Two ready positions for the bins are shown as designated 56 and 58. As will be seen from the following description, next successive bins in the sequence are brought to the ready positions prior to being moved to the central assembly position 54.

Each of the bins 26 are constructed with a bottom, sides and open top. The front of the side elements are angled forward and the bottom is tapered upwardly so that the circuit elements located in the bin can be conveniently extracted by the operator.

The bin movement mechanism located at each of the assembly locations 16 and 18 may be mounted on one of the shelves 24 and is supported on a mount 60 secured to the shelf. A pair of ball slides 62 and 64 are provided and the outer elements of each are secured in fixed position to the mount 60.

The reciprocating carriage assembly is mounted on a slide plate 66 secured to the inner elements of the ball slides 62, 64.

Secured to the upper surface of slide plate 66 is a center divider 68 and two upstanding mounting brackets 70 and 72. The separation between each of the mounting brackets and the center divider is somewhat greater than the width of a parts bin 26 so that a bin may be readily and easily received between the divider and either bracket.

Secured to each of the mounting bracket 70, 72 are a pair of air cylinders 74, 76 and 78, 80. The piston of each air cylinder has secured at its outer end a disc as 82, 84, 86 and 88 which as will be explained hereafter, are brought against the parts bins to urge them into precise position.

Figure 4:
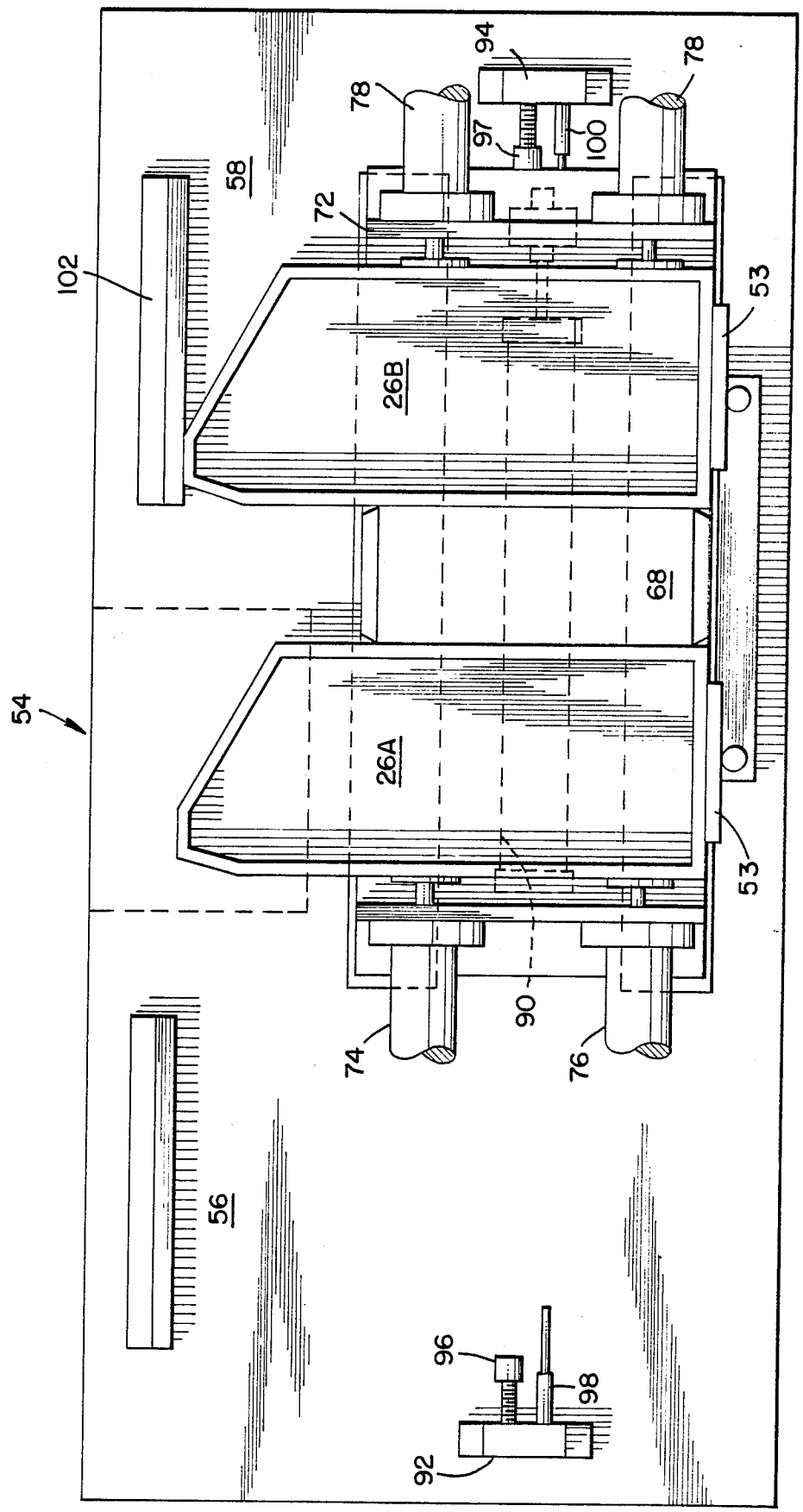
FIG. 4 is a top view of an assembly location showing two parts bins.

The entire carriage assembly is reciprocated by means of an air cylinder 90, the piston (not shown) of which is appropriately secured to the underside of slide plate 66 in any convenient manner. It is seen then that actuation of air cylinder 90 will reciprocate the carriage assembly between two fixed positions to move the positioned parts bins between the ready positions 56, 58 and the assembly position 54. In the right hand position as shown in FIGS. 4 and 5 a parts bin is located in the ready position 58 and another parts bin in the assembly position 54. In the other position of the carriage assembly as shown in FIG. 6 a parts bin is located in the ready position 56 and another parts bin in the assembly position 54. A pair of brackets 92 and 94 are secured to the shelf 24 and each mount a stop member 96, 97 and a shock or cushioning cylinder 98 and 100. Thus as the carriage assembly is moved between the left hand and the right hand positions it will be stopped in a fixed predetermined position by stops 96 and 97 respectively and the movement to the stopped position cushioned by air cylinders 98 and 100.

In operation the transport picker mechanism 48 will bring a parts bin such as 26B to a ready position as 58 and the bin will be moved forward until its front end contacts a bin stop 102. At this point in the operation air cylinders 78 and 80 will actuate their respective pistons and discs 86, 88 will contact the side of parts bin 26B to urge it up against the central divider 68. Thus the bin stop 102 and center divider 68 will cause the parts bin to be precisely located on the carriage assembly. When the operator has completed using parts bin 26A, after the component is inserted on the circuit board and perhaps excess components returned to the parts bin, he will operate a switch that will actuate the carriage mechanism to move it to the left hand position thereby bringing parts bin 26B into the assembly position 54. An important feature of the invention is that the parts bin in the ready position is promptly brought to the assembly position without any appreciable time delay. Thus, with bin 26B in the assembly position, 26A is moved to the ready position 56, whereupon the picker mechanism can remove and return it to its home position while the operator is utilizing the bin 26B now in the assembly position. When the picker mechanism returns bin 26A to its home position it will then move to the next bin in the programmed sequence and retract it from its home position on the rack and bring it to the ready position 56. It is understood that a particularly advantageous feature of the present invention is the provision of two ready positions adjacent the assembly position which serve to minimize wasted intervals of time in bringing parts bins to the assembly position.

Figure 7:
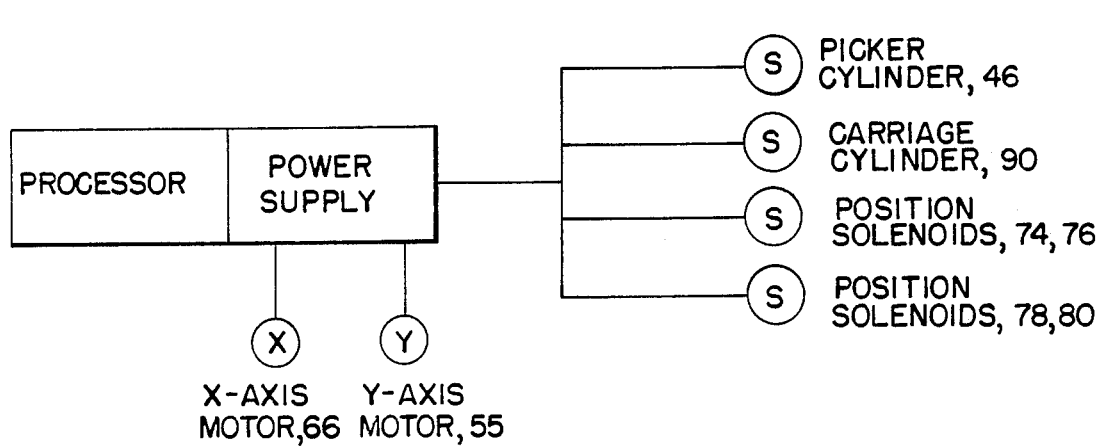
FIG. 7 is a block diagram of control elements of the system.

Referring to FIG. 7 there is diagrammatically shown a central processor and power supply of conventional construction that coordinate the above described mechanical operations. It is understood that the processor is programmed to cause delivery of the bins 26 to an assembly location in a predetermined sequence. The bins are brought to the appropriate ready position from their home position by the programmed operation of the X and Y axis motors 66 and 55 respectively. The processor also controls the timed operation of solenoids S to operate the picker cylinder 46 and carriage cylinder 90 and positioning cylinders 74, 76, 78 and 80.

A cycle of operation would proceed in the following manner. With a bin 26A located in an assembly position as 54 and the next succeeding bin 26B in a ready position as 58, the mechanism for a particular location as 16 is stationary. The operator withdraws components from the bin 26A, inserts a component in a PC board and returns any remaining ones to bin 26A.

1. When the operators manual operation is complete she operates a switch (not shown) as by a foot pedal.

2. The carriage cylinder immediately actuates to simultaneously move bin 26A to ready position 56 and bin 26B to assembly position 54 where the operator can promptly extract the next required circuit element.

3. The X-Y motors 66, 55 then move the picker carriage 44 to the ready position 56 to remove bin 26A and return it to its home position.

4. The X-Y motors then proceed to the next bin on the rack and carry it to ready position 56.

5. Positioning solenoids actuate positioning cylinders 74, 76 to move the bin in ready position 56 against central stop 68 so that it is correctly positioned.

6. The X-Y motors may then move the picker mechanism 44, to a central standby position until it is called upon to move a bin to or from a home or ready position.

The invention has been described with particular reference to the operation at one assembly location as 16. It is of course understood that a similar mechanism exists at a second or more assembly locations as 18. Multiple stations require appropriate programming of the central processor so that the picker mechanism 44 serves both locations. The particular programming used is not part of the present invention and is within the abilities of a skilled programmer.

Although the present invention has been described with respect to a specific embodiment it is understood that various modifications and embodiments may be made within the spirit and scope of the appended claims.

I claim:

1. A system for transporting components to a predetermined location for assembly comprising:
   a plurality of component containers each adapted to contain a supply of components;
   rack means providing a home position for each said container and defining a vertical plane;
   means providing an assembly position at which components may be withdrawn from the containers;
   means providing a first container ready position adjacent said assembly position;
   means providing a second container ready position adjacent said assembly position;
   said assembly position and first and second ready positions being located on said rack means in said vertical plane;
   transport means to individually transport the containers from their respective home positions to the first container ready position and the second container ready position and from the first and second container ready positions to the repsective home positions;
   moving means to selectively move a container from the first container ready position to the assembly position and from the second ready position to the assembly position; and
   means to control the activation of the transport means and moving means.

2. A system as set forth in claim 1 in which the said moving means comprises a reciprocating means adapted to receive two containers.

3. A system as set forth in claim 1 in which the said moving means comprises a reciprocating carriage;
   means to activate said carriage to reciprocate between the said first container ready position and the said second container ready position;
   a center stop positioning means dividing the carriage into two container receiving areas; and
   means to urge a container located on said carriage means against said stop positioning means.

4. A system for transporting components to a predetermined location for assembly comprising;
   a plurality of component bins each adapted to contain a supply of similar components;
   rack means providing a home position for each said bin in a vertical plane;
   means providing an assembly position at which components may be withdrawn from the bins;
   means providing a first bin ready position adjacent said assembly position;
   means providing a second bin ready position adjacent said assembly position;
   said assembly position and first and second ready positions being located on the rack means in said vertical plane;
   transport means to individually transport the bins from their respective home positions to the first bin ready position and the second bin ready position, and from the first and second bin ready positions to the respective home positions;
   moving means to selectively move a container from the first bin ready position to the assembly position and from the second bin ready position to the assembly position;
   said moving means comprising a carriage assembly adapted to hold two bins;
   means to reciprocate said carriage assembly between a first position and a second position whereby one bin on said carriage means may be moved from the said assembly position to a ready position and the other bin moved from a ready position to the assembly position.

5. A system as set forth in claim 4 in which said carriage assembly comprises;
   a base member;

central dividing means secured to the support member dividing the carriage assembly into a first and second bin receiving section;

movable positioning means located in each of the bin receiving sections operable to urge a positioned bin against the central dividing means; and means to control said transport means, moving means and movable positioning means.

6. A system for transporting printed circuit components to a predetermined location for assembly on a printed circuit board comprising;

rack means having a plurality of shelves defining a predetermined plane;

a plurality of component containers located on said shelves;

means providing a component assembly position on said rack means;

means providing first and second ready positions adjacent said means providing the component assembly position whereby said assembly position and said first and second ready positions are located in said predetermined plane;

rectilinear transport means position adjacent the rack means including;

carriage means;

container picker means located on the carriage means;

means to move the carriage means in a predetermined sequence whereby the picker means moves containers in a predetermined sequence from the positions on the rack shelves to the first and second ready positions;

means to move the carriage means whereby the picker means moves the containers from the first and second ready positions to their predetermined positions on the rack shelves; and moving means operable to move a container in the first and second ready positions to the assembly position.

7. A system for transporting printed circuit components to a predetermined location for assembly as set forth in claim 6 including means to synchronize the transport means and moving means whereby the moving means moves a container from the ready position to the assembly position during the interval of time that the transport means moves a container from the assembly position on the containers home position on the rack means.

8. A system as set forth in claim 7 in which the container picker means includes electromagnetic means and reciprocating means secured to the electromagnet means to engage and transport the said containers.

9. A system as set forth in claim 8 including a first solenoid controlled air cylinder means to reciprocate the picker means and second solenoid controlled air cylinder means to activate the moving means.

* * * * *